US010203888B2

(12) United States Patent
Trika et al.

(10) Patent No.: US 10,203,888 B2
(45) Date of Patent: Feb. 12, 2019

(54) TECHNOLOGIES FOR PERFORMING A DATA COPY OPERATION ON A DATA STORAGE DEVICE WITH A POWER-FAIL-SAFE DATA STRUCTURE

(71) Applicant: Intel Corporation, Santa Clara, CA (US)

(72) Inventors: Sanjeev N. Trika, Portland, OR (US); Anand S. Ramalingam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 14/975,150

(22) Filed: Dec. 18, 2015

(65) Prior Publication Data

US 2017/0177243 A1 Jun. 22, 2017

(51) Int. Cl.
*G06F 11/00* (2006.01)
*G06F 3/06* (2006.01)
(Continued)

(52) U.S. Cl.
CPC .............. *G06F 3/0619* (2013.01); *G06F 1/26* (2013.01); *G06F 3/065* (2013.01); *G06F 3/0647* (2013.01);
(Continued)

(58) Field of Classification Search
CPC .............. G06F 11/2015; G06F 11/2056; G06F 11/2094; G06F 1/30
See application file for complete search history.

(56) References Cited

U.S. PATENT DOCUMENTS

| 5,195,100 A * | 3/1993 | Katz ................ G06F 11/08 714/22 |
| 5,889,968 A * | 3/1999 | Bennett ............. G06F 13/36 710/112 |

(Continued)

FOREIGN PATENT DOCUMENTS

| EP | 1396792 | 6/2005 |
| WO | 2011059638 | 5/2011 |

OTHER PUBLICATIONS

International search report for PCT application PCT/US2016/062796, dated Feb. 27, 2017 (3 pages).
(Continued)

*Primary Examiner* — Elmira Mehrmanesh
(74) *Attorney, Agent, or Firm* — Barnes & Thornburg LLP

(57) ABSTRACT

Technologies for performing a data copy operation on a data storage device include storing a copy token in a power-fail-safe data structure that identifies the source address and destination address of the data copy operation, updating an address table to indicate that the source and destination addresses are involved in the data copy operation, and notifying a host requesting that data copy operation that the data copy operation has been completed prior to performing the data copy operation. The host may subsequently perform other tasks while the data storage device completes the data copy operation. During the data copy operation, data access requests to the source or destination addresses are blocked based on the address table. Additionally, should a power failure event occur, the power-fail-safe data structure is saved to non-volatile data storage so that the copy operation may be completed upon the next power-on event of the data storage device.

25 Claims, 7 Drawing Sheets

(51) Int. Cl.
*G06F 1/26* (2006.01)
*G06F 11/20* (2006.01)
*G06F 11/14* (2006.01)

(52) U.S. Cl.
CPC ........ *G06F 3/0685* (2013.01); *G06F 11/1441* (2013.01); *G06F 11/2094* (2013.01); *G06F 11/2015* (2013.01); *G06F 2201/805* (2013.01)

(56) References Cited

U.S. PATENT DOCUMENTS

| | | | | |
|---|---|---|---|---|
| 7,174,416 B2* | 2/2007 | Hasbun | ............... | G06F 12/0246 711/103 |
| 8,032,787 B2* | 10/2011 | Atri | ............... | G06F 11/1441 714/22 |
| 8,127,104 B1 | 2/2012 | Sehn | | |
| 8,316,201 B2* | 11/2012 | Stern | ............... | G06F 11/1008 711/165 |
| 8,316,257 B2* | 11/2012 | Royer | ............... | G06F 11/1064 711/103 |
| 8,464,132 B2* | 6/2013 | Chen | ............... | G06F 11/1441 714/14 |
| 8,812,817 B2* | 8/2014 | Fuller | ............... | G06F 12/0802 711/118 |
| 9,047,172 B2* | 6/2015 | Burke | ............... | G06F 12/02 |
| 9,417,998 B2* | 8/2016 | Mylly | ............... | G06F 12/0246 |
| 9,774,677 B2* | 9/2017 | Hefty | ............... | G06F 13/28 |
| 2004/0049649 A1* | 3/2004 | Durrant | ............... | G06F 9/30032 711/165 |
| 2005/0210322 A1* | 9/2005 | Corrado | ............... | G06F 3/0619 714/13 |
| 2007/0083697 A1* | 4/2007 | Birrell | ............... | G06F 12/0246 711/103 |
| 2008/0082736 A1* | 4/2008 | Chow | ............... | G06F 12/0246 711/103 |
| 2009/0158085 A1* | 6/2009 | Kern | ............... | G06F 11/1064 714/6.13 |
| 2009/0172466 A1* | 7/2009 | Royer | ............... | G06F 11/1064 714/6.12 |
| 2009/0327759 A1* | 12/2009 | Royer | ............... | G06F 11/1441 713/193 |
| 2010/0161932 A1 | 6/2010 | Stern et al. | | |
| 2012/0005557 A1 | 1/2012 | Mardiks et al. | | |
| 2014/0068216 A1 | 3/2014 | Chung | | |
| 2016/0070336 A1* | 3/2016 | Kojima | ............... | G06F 12/0246 711/103 |

OTHER PUBLICATIONS

Written opinion for PCT application PCT/US2016/062796, dated Feb. 27, 2017 (4 pages).

* cited by examiner

… (1)

TECHNOLOGIES FOR PERFORMING A DATA COPY OPERATION ON A DATA STORAGE DEVICE WITH A POWER-FAIL-SAFE DATA STRUCTURE

BACKGROUND

Data copy operations on storage devices, such as solid state drives, hard disk drives, and memory devices, are quite common in typical computer systems. Data copy operations may be user- or system-initiated and are used to copy data from a source location(s) to a destination location(s). Some system operations, such as defragmentation, use data copy operations extensively. However, excessive use of data copy operations can create a bottleneck on a computer system because the host of the system must wait for the present data copy operation to complete before performing a subsequent task. Additionally, if power is lost during a data copy operation, the data may be lost if originally stored in a non-volatile memory or otherwise corrupted.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
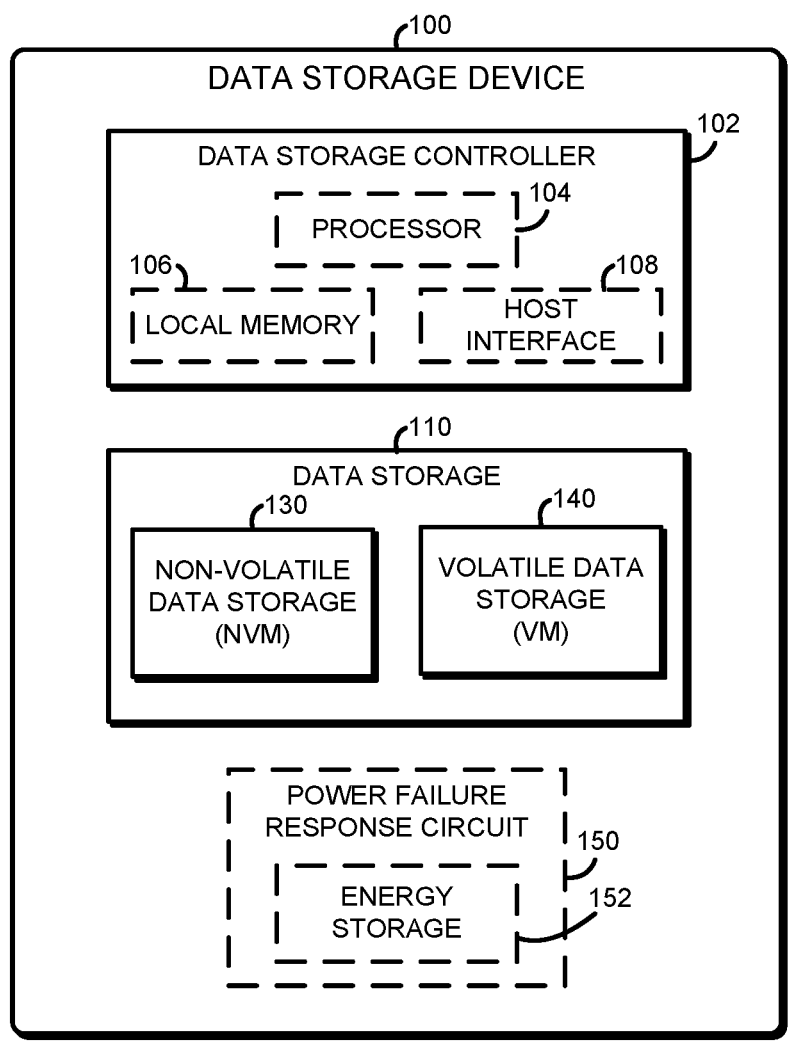
FIG. 1 is a simplified block diagram of at least one embodiment of a data storage device for performing a data copy operation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative data storage device 100 for performing a data copy operation includes a data storage controller 102 and data storage 110, which includes non-volatile data storage 130 and volatile data storage 140. As discussed in more detail below, in use, the data storage controller 102 is configured to perform a data copy operation requested by a host communicatively coupled to the data storage controller (see FIG. 2) in the background, allowing the host to perform other tasks. To do so, the data storage controller 102 promptly notifies the host that the requested data copy operation has been completed prior to actually completing the data copy operation. However, to ensure that the data copy operation is completed properly, the data storage controller 102 generates a copy token that identifies the source and destination locations and stores the copy token in a power-fail-safe data structure, which is automatically saved to the non-volatile data storage 130 should the data storage device 100 lose power during the performance of the data copy operation. Additionally, the data storage controller 102 marks the source and destination locations of the non-volatile data storage 130 (e.g., source and destination address(es)) in a suitable table, such as a logical-to-physical address table, to indicate that those locations are involved in or otherwise affected by the data copy operation. Should a power failure or other harmful event occur that interrupts the copy operation, the data storage controller 102 may reinitiate or otherwise complete the data copy operation upon successful power up. In this way, the data storage controller 102 is able to immediately "complete" the requested copy operation from the perspective of the requesting host, while providing some assurance that the copy operation will actually be completed at a later time (e.g., even in the event of a power failure).

The data storage device 100 may be embodied as any type of device capable of storing data and performing the functions described herein. In the illustrative embodiment, the data storage device 100 is embodied as a solid state drive; however, in other embodiments, the data storage device 100 may embodied as a hard disk drive, a memory module device, a cache memory device, and/or other data storage device.

The data storage controller 102 of the data storage device 100 may be embodied as any type of control device, circuitry, or collection of hardware devices capable of performing a data copy operation on the non-volatile memory storage 130. In the illustrative embodiment, the data storage controller 102 includes a processor or processing circuitry 104, local memory 106, and a host interface 108. Of course, the data storage controller 102 may include additional devices, circuits, and/or components commonly found in a drive controller of a solid state drive in other embodiments.

The processor 104 may be embodied as any type of processor capable of performing the functions described herein. For example, the processor 104 may be embodied as a single or multi-core processor(s), digital signal processor, microcontroller, or other processor or processing/controlling circuit. Similarly, the local memory 106 may be embodied as any type of volatile and/or non-volatile memory or data storage capable of performing the functions described herein. In the illustrative embodiment, the local memory 106 stores firmware and/or other instructions executable by the processor 104 to perform the described functions of the data storage controller 102. In some embodiments, the processor 104 and the local memory 106 may form a portion of a System-on-a-Chip (SoC) and be incorporated, along with other components of the data storage controller 102, onto a single integrated circuit chip.

The host interface 108 may also be embodied as any type of hardware processor, processing circuitry, input/output circuitry, and/or collection of components capable of facilitating communication of the data storage device 100 with a host device or service (e.g., a host application). That is, the host interface 108 embodies or establishes an interface for accessing data stored on the data storage device 100 (e.g., stored in the data storage 110). To do so, the host interface 108 may be configured to utilize any suitable communication protocol and/or technology to facilitate communications with the data storage device 100 depending on the type of data storage device. For example, the host interface 108 may be configured to communicate with a host device or service using Serial Advanced Technology Attachment (SATA), Peripheral Component Interconnect express (PCIe), Serial Attached SCSI (SAS), Universal Serial Bus (USB), and/or other communication protocol and/or technology in some embodiments.

The non-volatile data storage 130 may be embodied as any type of data storage capable of storing data in a persistent manner. For example, in the illustrative embodiment, the non-volatile data storage 130 is embodied as non-volatile memory and is referred to hereinafter as non-volatile memory 130 with the understanding that the non-volatile data storage 130 may be embodied as other types of persistent data storage, such as hard disk platters, in other embodiments. The non-volatile memory 130 may be embodied as NAND flash memory, NOR flash memory, phase change memory (PCM), electrically erasable programmable read-only memory (EEPROM), resistive memory, nanowire memory, three-dimensional cross point memory arrays ferro-electric transistor random access memory (FeTRAM), magnetoresistive random access memory (MRAM), spin transfer torque MRAM, and/or other non-volatile memory.

The volatile data storage 140 may be embodied as any type of data storage capable of storing data while the data storage device 100 is in operation. For example, in the illustrative embodiment, the volatile data storage 140 is embodied as volatile memory and is referred to hereinafter as volatile memory 140 with the understanding that the non-volatile data storage 130 may be embodied as other types of non-persistent data storage in other embodiments. The volatile memory 140 may be embodied as dynamic random access memory (DRAM) or other type of volatile memory.

In some embodiments, the data storage device 100 may also include the power fail response circuit 150, which is configured to provide backup power to certain components of the data storage device 100 for a period of time in the event that power to the data storage device 100 is unexpectedly lost or interrupted. To do so, the power fail response circuit 150 includes an energy storage 152, which may be embodied as any type of energy storage device or devices capable of providing power to components of the data storage device 100 for a period of time. In the illustrative embodiment, the energy storage 152 is embodied as a bank of capacitors, which are charged during operation and from which energy can be extracted in the event of a power interruption. In other embodiments, the energy storage 152 may be embodied as, or otherwise include, other types of energy storage devices such as backup batteries.

Figure 2:
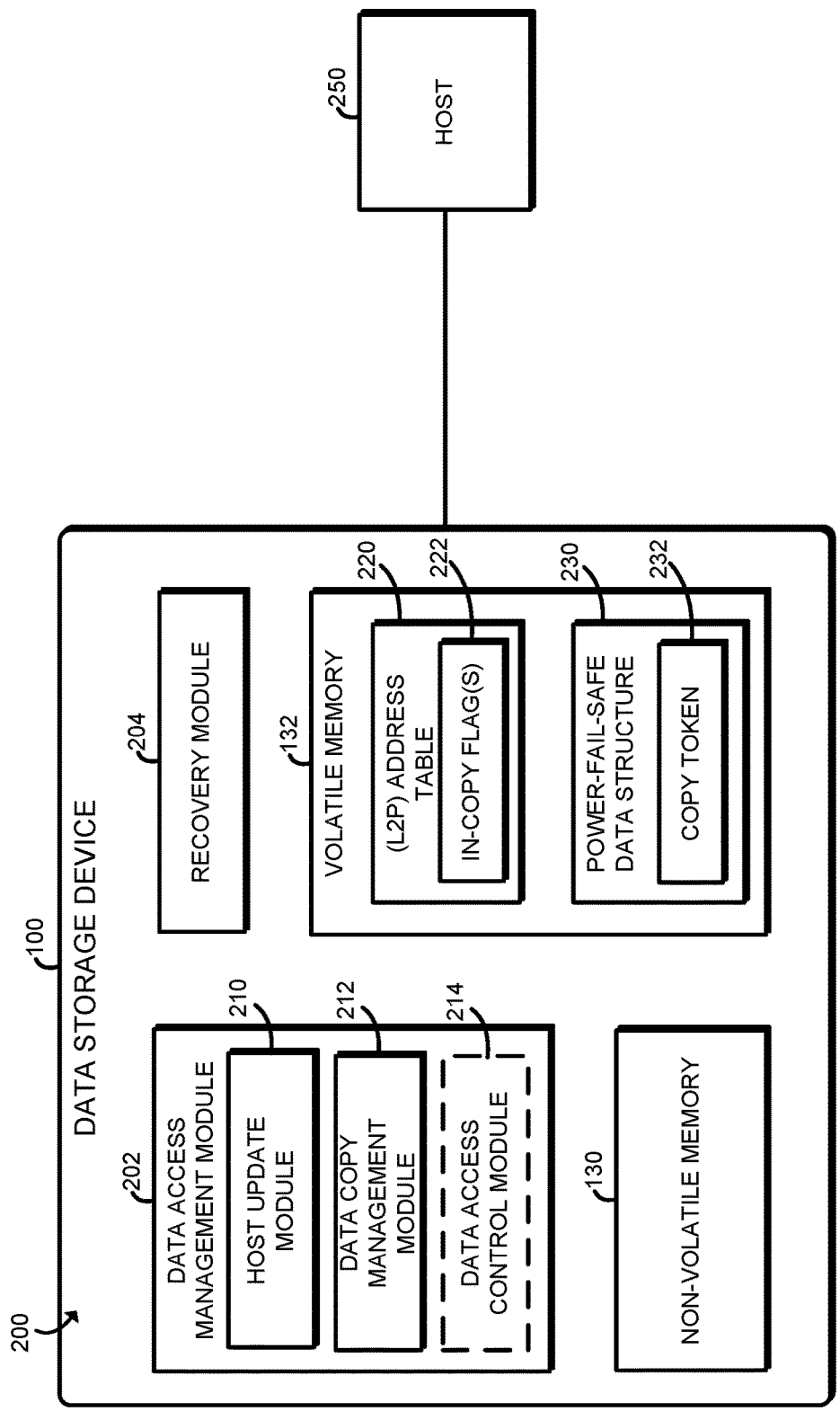
FIG. 2 is a simplified block diagram of at least one embodiment of an environment that may be established by the data storage device of FIG. 1.

Referring now to FIG. 2, in use, the data storage device 100 may establish an environment 200. The illustrative environment 200 includes a data access management module 202 and a recovery module 204. Each of the modules and other components of the environment 200 may be embodied as firmware, software, hardware, or a combination thereof. For example the various modules, logic, and other components of the environment 200 may form a portion of, or otherwise be established by, the data storage controller 102 or other hardware components of the data storage device 100. As such, in some embodiments, any one or more of the modules of the environment 200 may be embodied as a circuit or collection of electrical devices (e.g., a data access management circuit 202, a recovery circuit 204, etc.).

The data access management module 202 is configured to handle data access requests received from a host 250, which may be embodied as an application, service, and/or other device. To do so, the data access management module 202 includes a host update module 210 configured to notify the host 250 that the requested data copy operation has been completed prior to completion of the data copy operation by the data storage device 100. For example, in some embodiments, the host update module 210 may immediately or otherwise promptly notify the host 250 of completion of the requested data copy operation upon receiving the request from the host 250. As such, the host 250 may proceed with performing other tasks while the data storage device 100 actually completes the requested data copy. In this way, the performance of the host 250 may be improved.

The data access management module 202 also includes a data copy management module 212 configured to perform the requested data copy operation. To do so, the data copy management module 212 generates a copy token 232 and stores the copy token 232 in a power-fail-safe data structure 230, which may be stored in the volatile memory 132 during operation of the data storage device 100. As discussed above, the copy token 232 identifies the source location from which the data is to be copied and the destination location to which the data is to be copied. For example, the copy token 232 may identify the source address or range of addresses of the non-volatile memory 130 and the destination address or range of addresses of the non-volatile memory 130.

As discussed above, in the case of a power failure event, the data storage device 100 moves the power-fail-safe data structure 230 from the non-volatile memory 132 to the non-volatile memory 130. To do so, the power fail response circuit 150 is configured to provide enough power to the suitable components of the data storage device 100 to effect the transfer of the power-fail-safe data structure 230 to the non-volatile memory 132.

In addition to the generating and storing the copy token 232, the data copy management module 212 is configured to mark or flag the source and destination locations in a suitable address table 220. Illustratively, the address table 220 is embodied as a logical-to-physical address table 220 that maps the logical addresses of the non-volatile memory 130 to physical addresses of the non-volatile memory 130. As such, in the illustrative embodiment, the data copy management module 212 marks the source address or range of addresses and the destination address or range of addresses in the logical-to-physical address table 220 by setting a corresponding in-copy flag or bit 222 of the table 220 associated with the source and destination addresses. Of course, in other embodiments, the address table 220 may be embodied as any suitable data structure used to identify the source and destination locations affected by the copy operation, and in such embodiments, the data copy management module 212 may utilize any suitable method for marking or identifying the source and destination locations/addresses in such table.

After the data copy management module 212 generates the copy token 232 and sets the in-copy flag(s) 222, the data copy management module 212 completes the data copy operation by copying data from the source location to the destination location. Once the copy operation completes successfully, the data copy management module 212 deletes the associated copy token 232 and removes or unsets the associated in-copy flag(s) 222.

In some embodiments, the data access management module 202 may also include a data access control module 214. In such embodiments, the data access control module 214 is configured to control access to various regions of the non-volatile memory 130. For example, the data access control module 212 is configured to block access requests (e.g., read or write requests) to the source and destination addresses or range of addresses associated with the data copy operation as identified by the in-copy flags 222 of the address table 220. That is, the data access control module 214 is configured to monitor the address table 220 and block accesses to those addresses identified by the in-copy flags 222.

The recovery module 204 is configured to reinstate or otherwise complete a data copy operation that was interrupted due to a power failure event or other event that halted the data copy operation. To do so, upon power up or recovery from the event, the recovery module 204 determines whether an in-copy flag 232 is present in the power-fail-safe data structure 230, which may be stored in the non-volatile memory 130 in response to the power failure event. If the copy token 232 is present, the recovery module 204 notifies the data copy management module 212 to complete the data copy operation as discussed above.

Figure 3:
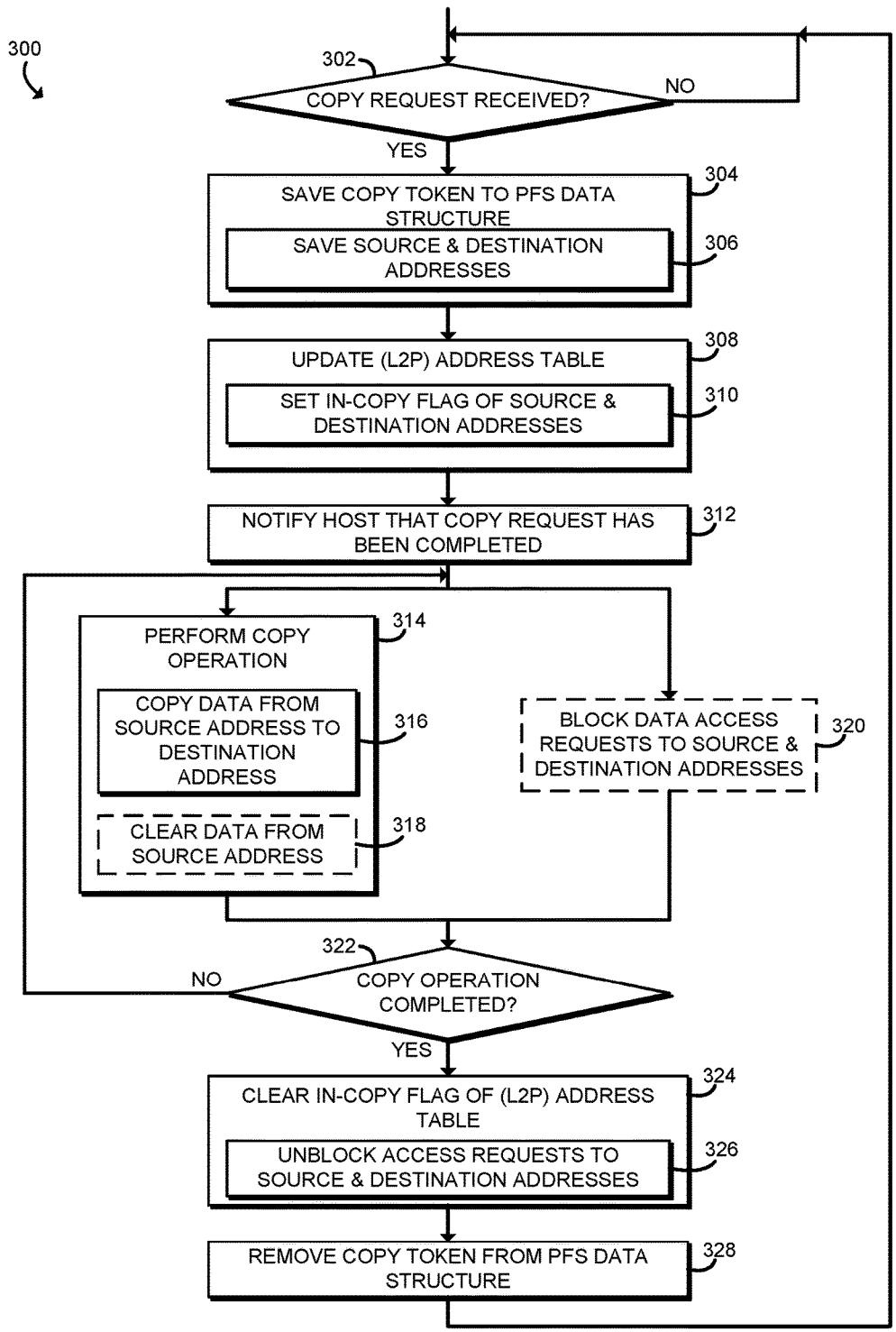
FIG. 3 is a simplified block diagram of at least one embodiment of a method for performing a data copy operation that may be executed by the data storage device of FIGS. 1 and 2.

Referring now to FIG. 3, in use, the data storage controller 102 of the data storage device 100 may execute a method 300 for performing a data copy operation. The method 300 begins with block 302 in which the data storage controller 102 determines whether a data copy request has been received from the host 250. If so, the method 300 advances to block 304 in which the data storage controller 102 generates a copy token 232 and saves the copy token 232 in the power-fail-safe data structure 230. As discussed above, the copy token 232 identifies the source location and destination location of the data to be copied in the non-volatile memory 130. For example, in the illustrative embodiment, the copy token 232 includes the source address or range of addresses from which the data is to be copied and the destination address or range of address to which the data is to be copied. As such, the data storage controller 102 stores the corresponding source and destination addresses in block 306 via storage of the copy token 232.

In block 308, the data storage controller 102 updates the address table 220 to provide an indication that the corresponding source and destination addresses are involved in or affected by the requested data copy operation. For example, in block 310, the data storage controller 102 may set the in-copy flag 222 of the address table 220 (e.g., a logical-to-physical address table) associated with each of the source address or range of addresses and the destination address or range of addresses to indicate that such addresses are associated with the requested data copy operation.

In block 312, the data storage controller 102 notifies the host 250 that the requested data copy operation has been completed. That is, as discussed above, the data storage controller 102 notifies the host 250 of the completion of the requested data copy operation prior to the data storage controller 102 actually completing the data copy operation. It should be appreciated that the blocks 304, 308, 312 may be executed in any order or contemporaneously with each other. For example, in some embodiments, the data storage controller 102 may be configured to notify the host 250 that the requested data copy operation has been completed prior to storing the copy token 232 and/or setting the in-copy flags 222.

After the host 250 has been notified of the completion of the requested data copy operation, the method 300 advances to blocks 314 and 320. In block 314, the data storage controller 102 performs the requested data copy operation. To do so, in block 316, the data storage controller 102 copies data from the source address or range of addresses of the non-volatile memory 130 to the destination address or range of addresses of the non-volatile memory 130. Additionally, if the requested data copy command is embodied as a data move command, the data storage controller 102 deletes the data from the source address or range of addresses in block 318. To do so, the data storage controller 102 may set a flag or bit in a control register of the data storage controller 102 to indicate that the "deleted" source address or range of addresses is available for a write operation. Alternatively, in some embodiments, the data storage controller 102 may actually clear the data or write default data (e.g., all 0's) to the source address or range of address to delete or remove the data therefrom.

In some embodiments, the data storage controller 102 may be configured to complete the individual write operations of the overall data copy operation in the order in which the corresponding read operations are completed. That is, unlike a typical data storage device in which every address of a data block is read prior to writing the data block back to the data storage, the data storage controller 102 may write the individual addresses or sub-block of addresses to the data storage 110 based on the order in which those individual addresses or sub-block of address are read from the data storage 110. For example, due to varying delays in the read operation, some addresses may be read out-of-order relative to other addresses. In such embodiments, the data storage controller 102 may complete the corresponding write operation of those "out-of-order" addresses as their corresponding read operation is completed, rather than waiting for the entire range of addresses to be read. It should be appreciated that writing data back to the data storage 110 in the order in which the data is read may improve the performance of the data copy operation performed by the data storage device.

In some embodiments, in block 320, the data storage controller 102 is configured to block memory accesses to the source address or range of addresses and the destination address or range of addresses associated with the data copy operation while the operation is being performed in block 314. That is, the data storage controller 102 may block write and/or read access to the source and destination addresses while the in-copy flag 222 associated with such addresses is set in the address table 220.

In block 322, the data storage controller 102 determines whether the requested data copy operation has completed. If not, the method 300 loops back to block 314 and 320 in which the data storage controller 102 continues to perform the requested data copy operation and, optionally, blocks accesses to the associated memory addresses. If, however, the requested data copy operation has been completed by the data storage device 100, the method 300 advances to block 324 in which the data storage controller 102 clears the in-copy flag 222 or other indication from the address table 220. Additionally, in block 324, if access to the associated memory addresses of the non-volatile memory 130 was blocked in block 320, such access in unblock in block 326 in response to the removal of the associated in-copy flags 222 or other indication. Subsequently, in block 328, the data storage controller 102 removes the copy token from the power-fail-safe data structure 230, and the method 300 loops back to block 302 in which the data storage controller 102 continues to monitor for copy requests from the host 250.

Figure 4:
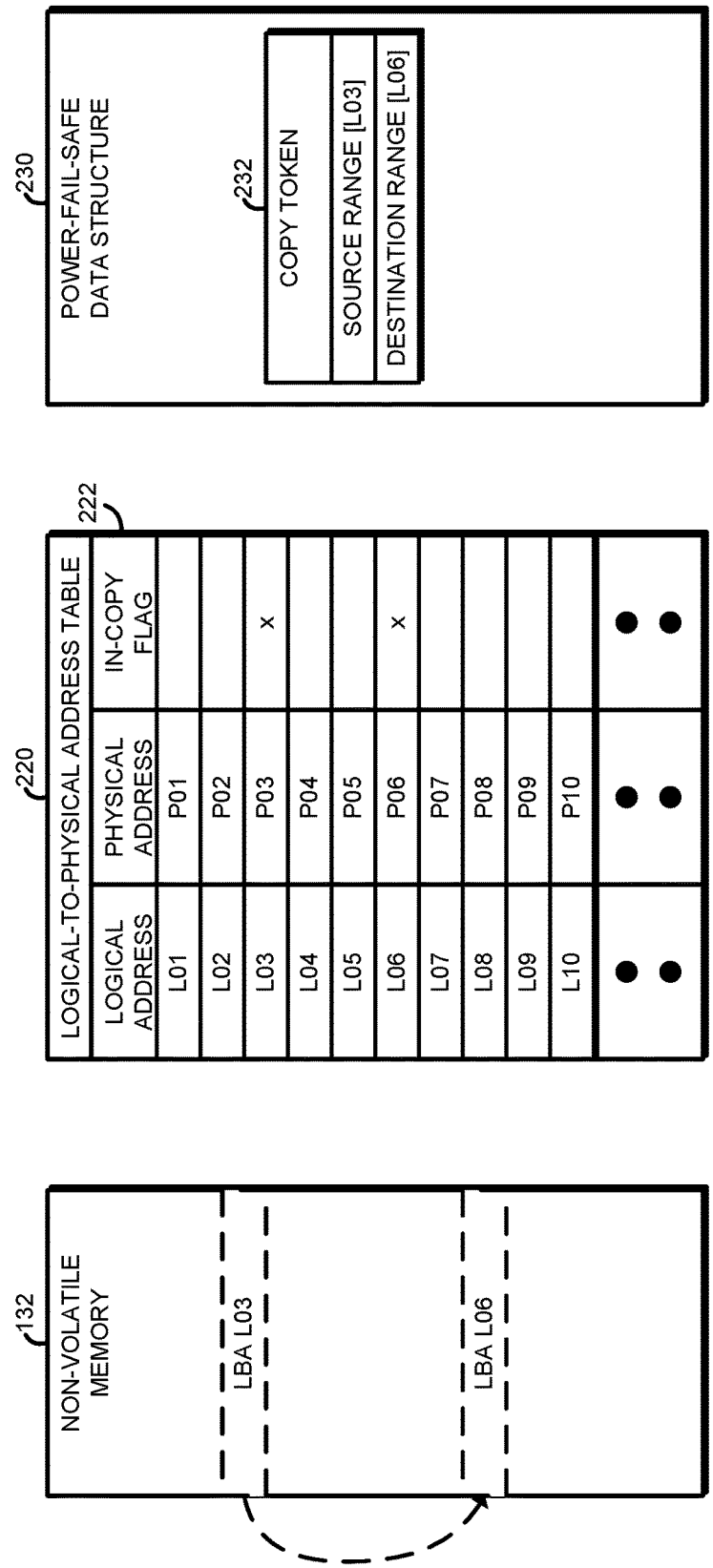
FIG. 4 is a simplified block diagram of an illustrative example of a logical-to-physical address table and a power-fail-safe data structure of the data storage device of FIGS. 1 and 2 during execution of the method of FIG. 3.

An illustrative embodiment of the non-volatile memory 132, the logical-to-physical address table 220, and the power-fail-safe data structure 230 during execution of the method 300 is shown in FIG. 4. In the illustrative embodiment, the data storage device 100 has received a data copy request from the host 250 to copy data from a logical block address L03 to a logical block address L06 of the non-volatile memory 132. As such, the data storage controller 102 has set the in-copy flag 222 associated with each of the logical addresses L03 and L06 in the logical-to-physical address table 220 to indicate that those addresses are associated with or otherwise affected by the requested data copy operation. Additionally, the data storage controller 102 has generated and stored a copy token 232 in the power-fail-safe data structure 230. The copy token 232 identifies the source address range L03 and the destination address range L06, as discussed above.

Figure 5:
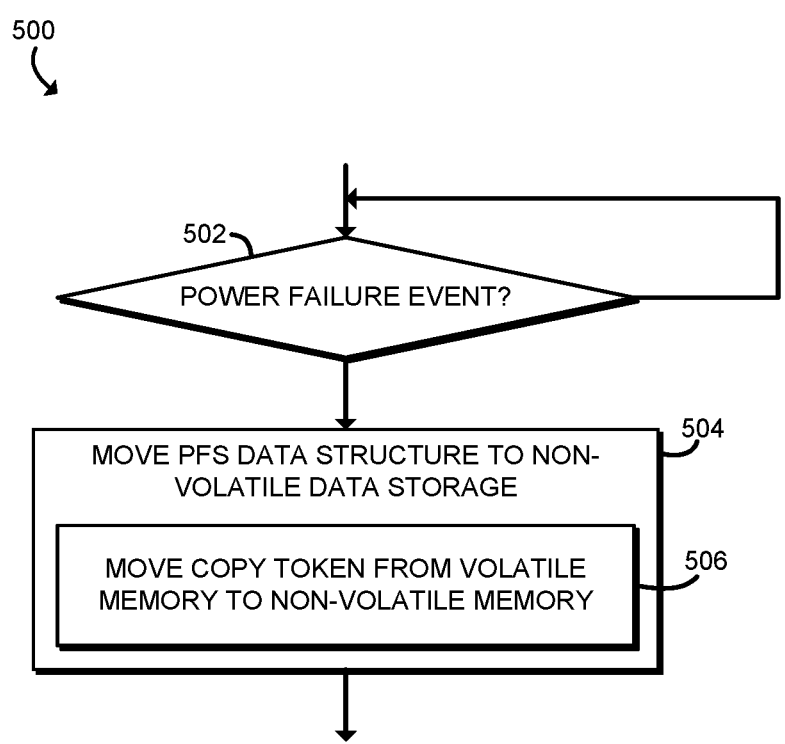
FIG. 5 is a simplified flow diagram of at least one embodiment of a method for responding to a power failure event that may be executed by the data storage device of FIGS. 1 and 2.

Referring now to FIG. 5, in use, the data storage controller 102 may also execute a method 500 for responding to a power failure event. The method 500 begins with block 502 in which the data storage controller 102 determines whether a power failure event has occurred. To do so, in some embodiments, the power failure response circuit 150 may be configured to detect the onset of a power failure event. For example, the power failure response circuit 150 may monitor the supply voltage to the data storage device 100 and determine a power failure event is occurring or about to occur based on a fluctuation or dip in violate. Of course, the power failure response circuit 150 may utilize other methods and techniques to detect or determine that a power failure event has occurred or is about to occur.

If the data storage controller 102 determines that a power failure event has or will occur, the method 500 advances to block 504. In block 504, the data storage controller 102, under power form the power failure response circuit 150, moves the power-fail-safe data structure from the volatile memory 132 to the non-volatile memory 130. In doing so, the copy token 232 is moved to the non-volatile memory 130 in block 506. In this way, the copy token may be preserved across a power failure event to facilitate the reinstate or completion of the data copy operation upon later power up as discussed below.

Figure 6:
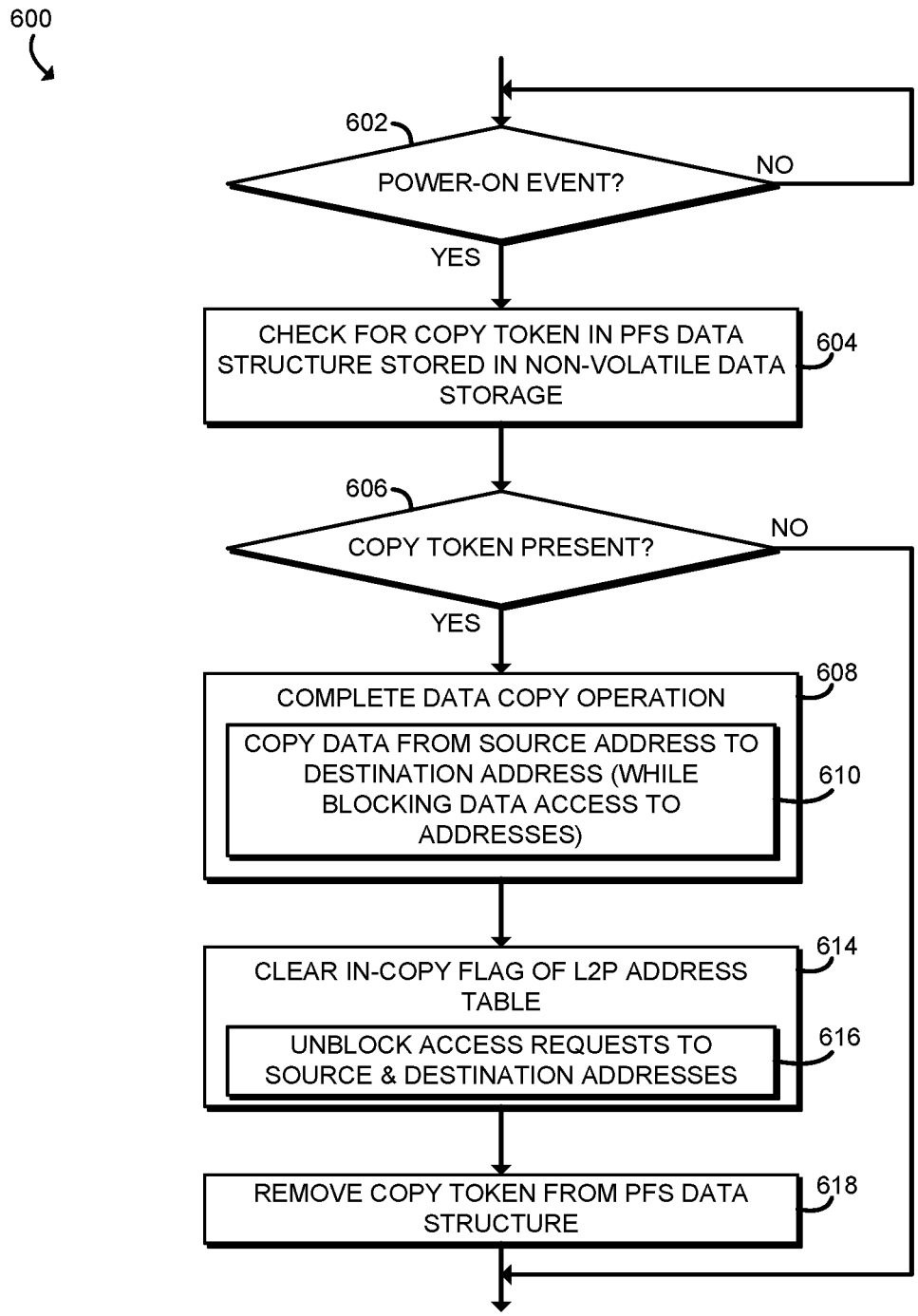
FIG. 6 is a simplified flow diagram of at least one embodiment of a method for restoring a data copy operation after a power failure.

Referring now to FIG. 6, in use, the data storage controller 102 may also execute a method for restoring a data copy operation after a power failure. The method begins with block 602 in which the data storage controller 102 determines whether the data storage device 100 has been power on after a power failure event. If so, the method 600 advances to block 604 in which the data storage controller 102 checks for the presence of a copy token 232 in the power-fail-safe data structure 230, which may be present stored in non-volatile memory 130 due to the power failure event as discussed above in regard to FIG. 5. If the data storage controller 102 determines that the copy token is present in the power-fail-safe data structure 230, the method 600 advances to block 608 in which the data storage controller 102 completes the data copy operation. For example, in block 610, the data storage controller 102 completes the copying (or moving) of data from the source address or range of addresses of the non-volatile memory 130 to the destination address or range of addresses of the non-volatile memory 130. Additionally, as discussed above, the data storage controller 102 may block memory accesses to the source and destination addresses during the data copy operation.

After the data storage controller 102 has completed the data copy operation, the method 600 advances to block 614 in which the data storage controller 102 clears the in-copy flag 222 or other indication from the address table 220. Additionally, in block 616, if access to the associated memory addresses of the non-volatile memory 130 has been blocked, such access is unblocked in block 616 in response to the removal of the associated in-copy flags 222 or other indication. Subsequently, in block 618, the data storage controller 102 removes the copy token from the power-fail-safe data structure 230. In this way, the data storage controller 102 is configured to reinstate and complete a data copy operation previously interrupted by a power failure event.

Figure 7:
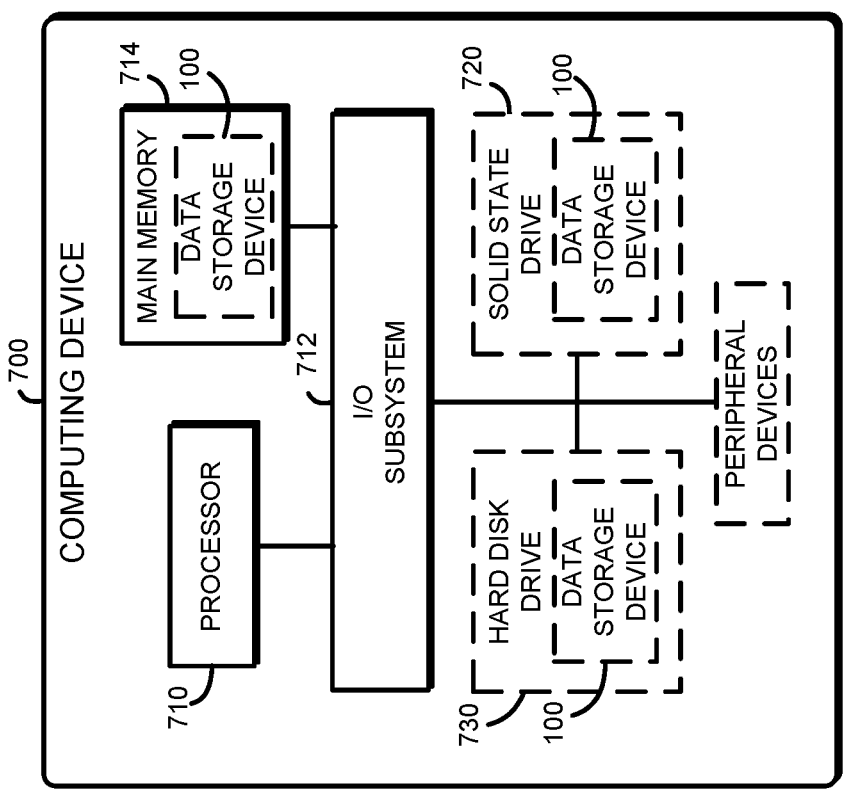
FIG. 7 is a simplified block diagram of at least one embodiment of a computing device including the data storage device of FIGS. 1 and 2.

Referring now to FIG. 7, in some embodiments, the data storage device 100 may be incorporated in, or form a portion of, a computing device 700. The computing device 700 may be embodied as any type of computing device in which the data storage device 100 may be used. For example, the computing device 700 may be embodied as a smart phone, a tablet computer, a notebook, a laptop computer, a netbook, an Ultrabook™, a wearable computing device, a pair of smart glasses, a head-mounted computing device, a cellular phone, a desktop computer, a smart device, a personal digital assistant, a mobile Internet device, a server, a data storage device, and/or any other computing/communication device.

As shown in FIG. 7, the illustrative computing device 700 includes a processor 710, an input/output ("I/O") subsystem 712, and a main memory 714. Of course, the computing device 700 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 714, or portions thereof, may be incorporated in the processor 710 in some embodiments.

The processor 710 may be embodied as any type of processor capable of performing the functions described herein. For example, the processor 710 may be embodied as a single or multi-core processor(s), digital signal processor, microcontroller, or other processor or processing/controlling circuit. Similarly, the memory 714 may be embodied as any type of volatile or non-volatile memory or data storage capable of performing the functions described herein. In operation, the memory 714 may store various data and software used during operation of the computing device 700 such as operating systems, applications, programs, libraries, and drivers. The memory 714 is communicatively coupled to the processor 710 via the I/O subsystem 712, which may be embodied as circuitry and/or components to facilitate input/output operations with the processor 710, the memory 714, and other components of the computing device 700. For example, the I/O subsystem 712 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

As shown in FIG. 7, the data storage device 100 may be incorporated in, or form a portion of, one or more other components of the computing device 700. For example, the data storage device 100 may be embodied as, or otherwise be included in, the main memory 714. Additionally or alternatively, the data storage device 100 may be embodied as, or otherwise included in, a solid state drive 720 of the computing device 700. Further, in some embodiments, the data storage device 100 may be embodied as, or otherwise included in, a hard disk drive 730 of the computing device 700. Of course, in other embodiments, the data storage device 100 may be included in or form a portion of other components of the computing device 700.

Reference to memory devices can apply to different memory types, and in particular, any memory that has a bank group architecture. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, initial specification published in September 2012 by JEDEC), DDR4E (in development by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), and/or others, and technologies based on derivatives or extensions of such specifications.

In addition to, or alternatively to, volatile memory, in one embodiment, reference to memory devices can refer to a nonvolatile memory device whose state is determinate even if power is interrupted to the device, for such devices that have a bank group architecture. In one embodiment, the nonvolatile memory device is a block addressable memory device, such as NAND or NOR technologies. Thus, a memory device can also include a future generation nonvolatile devices, such as a three dimensional crosspoint memory device, or other byte addressable nonvolatile memory device. In one embodiment, the memory device can be or include multi-threshold level NAND flash memory, NOR flash memory, single or multi-level Phase Change Memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

EXAMPLES

Illustrative examples of the technologies disclosed herein are provided below. An embodiment of the technologies may include any one or more, and any combination of, the examples described below.

Example 1 includes a data storage device for performing a data copy operation, the data storage device comprising a non-volatile data storage having data stored therein; a volatile data storage; and a data storage controller to maintain an address table and a power-fail-safe data structure in the volatile data storage, wherein the address table comprises addresses of the non-volatile data storage, and wherein the data storage controller is to receive, from a host, a request to perform a data copy operation on the non-volatile data storage, wherein the request identifies a source address of the non-volatile data storage from which data is to be copied and a destination address of the non-volatile data storage to which the data is to be copied; store a copy token in the power-fail-safe data structure, wherein the copy token identifies the source address and the destination address; update the address table with an indication that each of the source address and the destination address are associated with the data copy operation; notify the host that the data copy operation has been completed; and perform, after notification of the host, the data copy operation to copy the data from the source address to the destination address.

Example 2 includes the subject matter of Example 1, and wherein the request identifies a range of source addresses of the non-volatile data storage from which data is to be copied and a corresponding range of destination addresses of the non-volatile data storage to which the data is to be copied.

Example 3 includes the subject matter of any of Examples 1 and 2, and wherein to perform the data copy operation comprises to read data from the range of source addresses, and write the read data to the range of destination addresses based on the order in which each read of a corresponding source address is completed Example 4 includes the subject matter of any of Examples 1-3, and wherein the address table comprises a logical-to-physical indirection table.

Example 5 includes the subject matter of any of Examples 1-4, and wherein to update the address table comprises to set a flag in the address table to indicate that the copy operation is being performed on the source address and destination address.

Example 6 includes the subject matter of any of Examples 1-5, and wherein the data storage controller is further to block data access requests to the source address or destination address while the flag in the address table is set.

Example 7 includes the subject matter of any of Examples 1-6, and wherein to notify the host that the data copy operation has been completed comprises to notify the host that the data copy operation has been completed prior to completion of the data copy operation.

Example 8 includes the subject matter of any of Examples 1-7, and wherein to perform the data copy operation comprises to perform the data copy operation while the host performs another task.

Example 9 includes the subject matter of any of Examples 1-8, and wherein to perform the data copy operation comprises to copy data from the source address of the non-volatile data storage to the destination address of the non-volatile data storage.

Example 10 includes the subject matter of any of Examples 1-9, and wherein to perform the data copy operation comprises to perform a data move operation to move the data from the source of the non-volatile data storage to the destination address of the non-volatile data storage.

Example 11 includes the subject matter of any of Examples 1-10, and wherein the data storage controller is further to update, in response to completion of the data copy operation, the address table to remove the indication that each of the source address and the destination address are associated with the data copy operation; and remove, in response to completion of the data copy operation, the copy token from the power-fail-safe data structure.

Example 12 includes the subject matter of any of Examples 1-11, and wherein to update the address table comprises to unblock data access requests to the source address and the destination address in response to the address table having been updated to remove the indication that each of the source address and the destination address are associated with the data copy operation.

Example 13 includes the subject matter of any of Examples 1-12, and wherein the data storage controller is further to detect a power failure event of the data storage device; and move, in response to detection of the power failure event, the power-fail-safe data structure from the volatile data storage to the non-volatile data storage.

Example 14 includes the subject matter of any of Examples 1-13, and wherein the data storage controller is further to determine, in response to a power-on event of the data storage device, whether another copy token is stored in the power-fail-safe data structure, wherein the another copy token identifies another source address and another destination address; and perform another data copy operation to copy data from the another source address to the another destination address.

Example 15 includes the subject matter of any of Examples 1-14, and wherein the data storage controller is further to update, in response to completion of the another data copy operation, the address table to remove an indication that each of the another source address and the another destination address are associated with the another data copy operation; and remove, in response to completion of the another data copy operation, the another copy token from the power-fail-safe data structure.

Example 16 includes the subject matter of any of Examples 1-15, and wherein the data storage device comprises a solid state drive, the non-volatile data storage comprises non-volatile memory, and the volatile data storage comprises volatile memory.

Example 17 includes a method for performing a data copy operation on a data storage device, the method comprising receiving, by a data storage controller of the data storage device and from a host, a request to perform a data copy operation on a non-volatile data storage of the data storage device, wherein the request identifies a source address of the non-volatile data storage from which data is to be copied and a destination address of the non-volatile data storage to which the data is to be copied; storing, by the data storage controller, a copy token in a power-fail-safe data structure, wherein the copy token identifies the source address and the destination address; updating, by the data storage controller, an address table with an indication that each of the source address and the destination address are associated with the data copy operation; notifying, by the data storage controller, the host that the data copy operation has been completed; and performing, by the data storage controller and after notifying the host, the data copy operation to copy the data from the source address to the destination address.

Example 18 includes the subject matter of Example 17, and wherein the request identifies a range of source addresses of the non-volatile data storage from which data is to be copied and a corresponding range of destination addresses of the non-volatile data storage to which the data is to be copied.

Example 19 includes the subject matter of any of Examples 17 and 18, and wherein performing the data copy operation comprises reading data from the range of source addresses, and writing the read data to the range of destination addresses based on the order in which each read of a corresponding source address is completed.

Example 20 includes the subject matter of any of Examples 17-19, and wherein updating the address table comprises updating a logical-to-physical indirection table with an indication that each of the source address and the destination address are associated with the data copy operation.

Example 21 includes the subject matter of any of Examples 17-20, and wherein updating the address table comprises setting a flag in the address table to indicate that the copy operation is being performed on the source address and destination address.

Example 22 includes the subject matter of any of Examples 17-21, and further including blocking data access requests to the source address or destination address while the flag in the address table is set.

Example 23 includes the subject matter of any of Examples 17-22, and wherein notifying the host that the data copy operation has been completed comprises notifying the host that the data copy operation has been completed prior to completing the data copy operation.

Example 24 includes the subject matter of any of Examples 17-23, and wherein performing the data copy operation comprises performing the data copy operation while the host performs another task.

Example 25 includes the subject matter of any of Examples 17-24, and wherein performing the data copy operation comprises copying data from the source address of the non-volatile data storage to the destination address of the non-volatile data storage.

Example 26 includes the subject matter of any of Examples 17-25, and wherein performing the data copy operation comprises performing a data move operation to move the data from the source of the non-volatile data storage to the destination address of the non-volatile data storage.

Example 27 includes the subject matter of any of Examples 17-26, and further including updating, by the data storage controller and in response to completing the data copy operation, the address table to remove the indication that each of the source address and the destination address are associated with the data copy operation; and removing, by the data storage controller and in response to completing the data copy operation, the copy token from the power-fail-safe data structure.

Example 28 includes the subject matter of any of Examples 17-27, and wherein updating the address table comprises unblocking data access requests to the source address and the destination address in response to the updating of the address table to remove the indication that each of the source address and the destination address are associated with the data copy operation.

Example 29 includes the subject matter of any of Examples 17-28, and further including detecting, by the data storage controller, a power failure event of the data storage device; and storing, in response to detecting the power failure event, the power-fail-safe data structure to the non-volatile data storage of the data storage device.

Example 30 includes the subject matter of any of Examples 17-29, and further including determining, in response to a power-on event of the data storage device and by the data storage controller, whether another copy token is stored in the power-fail-safe data structure, wherein the another copy token identifies another source address and another destination address; and performing, by the data storage controller, another data copy operation to copy data from the another source address to the another destination address.

Example 31 includes the subject matter of any of Examples 17-30, and further including updating, by the data storage controller and in response to completing the another data copy operation, the address table to remove an indication that each of the another source address and the another destination address are associated with the another data copy operation; and removing, by the data storage controller and in response to completing the another data copy operation, the another copy token from the power-fail-safe data structure.

Example 32 includes the subject matter of any of Examples 17-31, and wherein the data storage device comprises a solid state drive and the non-volatile data storage comprises non-volatile memory.

Example 33 includes one or more machine-readable storage media comprising a plurality of instructions stored thereon that, when executed, cause a data storage device to perform the method of any of Examples 17-32.

Example 34 includes a data storage device for performing a data copy operation, the data storage device comprising means for receiving, from a host, a request to perform a data copy operation on a non-volatile data storage of the data storage device, wherein the request identifies a source address of the non-volatile data storage from which data is to be copied and a destination address of the non-volatile data storage to which the data is to be copied; means for storing a copy token in a power-fail-safe data structure, wherein the copy token identifies the source address and the destination address; means for updating an address table with an indication that each of the source address and the destination address are associated with the data copy operation; means for notifying the host that the data copy operation has been completed; and means for performing, after notifying the host, the data copy operation to copy the data from the source address to the destination address.

Example 35 includes the subject matter of Example 34, and wherein the request identifies a range of source addresses of the non-volatile data storage from which data is to be copied and a corresponding range of destination addresses of the non-volatile data storage to which the data is to be copied.

Example 36 includes the subject matter of any of Examples 34 and 35, and wherein the means for performing the data copy operation comprises means for reading data from the range of source addresses, and means for writing the read data to the range of destination addresses based on the order in which each read of a corresponding source address is completed.

Example 37 includes the subject matter of any of Examples 34-36, and wherein the means for updating the address table comprises means for updating a logical-to-physical indirection table with an indication that each of the source address and the destination address are associated with the data copy operation.

Example 38 includes the subject matter of any of Examples 34-37, and wherein the means for updating the address table comprises means for setting a flag in the address table to indicate that the copy operation is being performed on the source address and destination address.

Example 39 includes the subject matter of any of Examples 34-38, and further including means for blocking data access requests to the source address or destination address while the flag in the address table is set.

Example 40 includes the subject matter of any of Examples 34-39, and wherein the means for notifying the host that the data copy operation has been completed comprises means for notifying the host that the data copy operation has been completed prior to completing the data copy operation.

Example 41 includes the subject matter of any of Examples 34-40, and wherein the means for performing the data copy operation comprises means for performing the data copy operation while the host performs another task.

Example 42 includes the subject matter of any of Examples 34-41, and wherein the means for performing the data copy operation comprises means for copying data from the source address of the non-volatile data storage to the destination address of the non-volatile data storage.

Example 43 includes the subject matter of any of Examples 34-42, and wherein the means for performing the data copy operation comprises means for performing a data move operation to move the data from the source of the non-volatile data storage to the destination address of the non-volatile data storage.

Example 44 includes the subject matter of any of Examples 34-43, and further including means for updating, in response to completing the data copy operation, the address table to remove the indication that each of the source address and the destination address are associated with the data copy operation; and means for removing, in response to completing the data copy operation, the copy token from the power-fail-safe data structure.

Example 45 includes the subject matter of any of Examples 34-44, and wherein the means for updating the address table comprises means for unblocking data access requests to the source address and the destination address in response to the updating of the address table to remove the indication that each of the source address and the destination address are associated with the data copy operation.

Example 46 includes the subject matter of any of Examples 34-45, and, further including means for detecting a power failure event of the data storage device; and means for storing, in response to detection of the power failure event, the power-fail-safe data structure to the non-volatile data storage of the data storage device.

Example 47 includes the subject matter of any of Examples 34-46, and further including means for determining, in response to a power-on event of the data storage device, whether another copy token is stored in the power-fail-safe data structure, wherein the another copy token identifies another source address and another destination address; and means for performing another data copy operation to copy data from the another source address to the another destination address.

Example 48 includes the subject matter of any of Examples 34-47, and further including means for updating, in response to completing the another data copy operation, the address table to remove an indication that each of the another source address and the another destination address are associated with the another data copy operation; and means for removing, in response to completing the another data copy operation, the another copy token from the power-fail-safe data structure.

Example 49 includes the subject matter of any of Examples 34-48, and wherein the data storage device comprises a solid state drive and the non-volatile data storage comprises non-volatile memory.

The invention claimed is:

1. A data storage device for performing a data copy operation, the data storage device comprising:
  a non-volatile data storage having data stored therein;
  a volatile data storage; and
  a data storage controller to maintain an address table and a power-fail-safe data structure, separate from the address table, in the volatile data storage, wherein the address table comprises addresses of the non-volatile data storage, and wherein the data storage controller is to:
    receive, from a host, a request to perform a data copy operation on the non-volatile data storage, wherein the request identifies a source address of the non-volatile data storage from which data is to be copied and a destination address of the non-volatile data storage to which the data is to be copied;
    store a copy token in the power-fail-safe data structure, wherein the copy token identifies the source address and the destination address;
    update the address table with an indication that each of the source address and the destination address are associated with the data copy operation;
    notify the host that the data copy operation has been completed; and
    perform, after the update of the address table and the notification of the host, the data copy operation to copy the data from the source address to the destination address.

2. The data storage device of claim 1, wherein the request identifies a range of source addresses of the non-volatile data storage from which data is to be copied and a corresponding range of destination addresses of the non-volatile data storage to which the data is to be copied.

3. The data storage device of claim 2, wherein to perform the data copy operation comprises to:
  read data from the range of source addresses, and
  write the read data to the range of destination addresses based on the order in which each read of a corresponding source address is completed.

4. The data storage device of claim 1, wherein to update the address table comprises to set a flag in the address table to indicate that the copy operation is being performed on the source address and destination address.

5. The data storage device of claim 1, wherein to notify the host that the data copy operation has been completed comprises to notify the host that the data copy operation has been completed prior to completion of the data copy operation.

6. The data storage device of claim 1, wherein to perform the data copy operation comprises to perform the data copy operation while the host performs another task.

7. The data storage device of claim 1, wherein the data storage controller is further to:
  update, in response to completion of the data copy operation, the address table to remove the indication that each of the source address and the destination address are associated with the data copy operation; and
  remove, in response to completion of the data copy operation, the copy token from the power-fail-safe data structure.

8. The data storage device of claim 1, wherein the data storage controller is further to:
  detect a power failure event of the data storage device; and
  move, in response to detection of the power failure event, the power-fail-safe data structure from the volatile data storage to the non-volatile data storage.

9. The data storage device of claim 1, wherein the data storage device comprises a solid state drive, the non-volatile data storage comprises non-volatile memory, and the volatile data storage comprises volatile memory.

10. A method for performing a data copy operation on a data storage device, the method comprising:
  receiving, by a data storage controller of the data storage device and from a host, a request to perform a data copy operation on a non-volatile data storage of the data storage device, wherein the request identifies a source address of the non-volatile data storage from which data is to be copied and a destination address of the non-volatile data storage to which the data is to be copied;
  storing, by the data storage controller, a copy token in a power-fail-safe data structure, wherein the copy token identifies the source address and the destination address;
  updating, by the data storage controller, an address table with an indication that each of the source address and the destination address are associated with the data copy operation, wherein the address table is separate from the power-fail-safe data structure;
  notifying, by the data storage controller, the host that the data copy operation has been completed; and
  performing, by the data storage controller and after updating of the address table and notifying the host, the data copy operation to copy the data from the source address to the destination address.

11. The method of claim 10, wherein the request identifies a range of source addresses of the non-volatile data storage from which data is to be copied and a corresponding range of destination addresses of the non-volatile data storage to which the data is to be copied.

12. The method of claim 11, wherein performing the data copy operation comprises:
reading data from the range of source addresses, and
writing the read data to the range of destination addresses based on the order in which each read of a corresponding source address is completed.

13. The method of claim 10, wherein updating the address table comprises setting a flag in the address table to indicate that the copy operation is being performed on the source address and destination address.

14. The method of claim 10, wherein notifying the host that the data copy operation has been completed comprises notifying the host that the data copy operation has been completed prior to completing the data copy operation.

15. The method of claim 10, wherein performing the data copy operation comprises performing the data copy operation while the host performs another task.

16. The method of claim 10, further comprising:
updating, by the data storage controller and in response to completing the data copy operation, the address table to remove the indication that each of the source address and the destination address are associated with the data copy operation; and
removing, by the data storage controller and in response to completing the data copy operation, the copy token from the power-fail-safe data structure.

17. The method of claim 10, further comprising:
detecting, by the data storage controller, a power failure event of the data storage device; and
storing, in response to detecting the power failure event, the power-fail-safe data structure to the non-volatile data storage of the data storage device.

18. One or more non-transitory, machine-readable storage media comprising a plurality of instructions stored thereon that, when executed, cause a data storage device to:
receive, from a host, a request to perform a data copy operation on a non-volatile data storage of the data storage device, wherein the request identifies a source address of the non-volatile data storage from which data is to be copied and a destination address of the non-volatile data storage to which the data is to be copied;
store a copy token in a power-fail-safe data structure, wherein the copy token identifies the source address and the destination address;
update an address table with an indication that each of the source address and the destination address are associated with the data copy operation, wherein the address table is separate from the power-fail-safe data structure;
notify the host that the data copy operation has been completed; and
perform, after the update of the address table and the notification of the host, the data copy operation to copy the data from the source address to the destination address.

19. The one or more non-transitory, machine-readable storage media of claim 18, wherein the request identifies a range of source addresses of the non-volatile data storage from which data is to be copied and a corresponding range of destination addresses of the non-volatile data storage to which the data is to be copied.

20. The one or more non-transitory, machine-readable storage media of claim 19, wherein to perform the data copy operation comprises to:
read data from the range of source addresses, and
write the read data to the range of destination addresses based on the order in which each read of a corresponding source address is completed.

21. The one or more non-transitory, machine-readable storage media of claim 18, wherein to update the address table comprises to set a flag in the address table to indicate that the copy operation is being performed on the source address and destination address.

22. The one or more non-transitory, machine-readable storage media of claim 18, wherein to notify the host that the data copy operation has been completed comprises to notify the host that the data copy operation has been completed prior to completing the data copy operation.

23. The one or more non-transitory, machine-readable storage media of claim 18, wherein to perform the data copy operation comprises to perform the data copy operation while the host performs another task.

24. The one or more non-transitory, machine-readable storage media of claim 18, wherein the plurality of instructions, when executed, further cause the data storage device to:
update, in response to completion of the data copy operation, the address table to remove the indication that each of the source address and the destination address are associated with the data copy operation; and
remove, in response to completion of the data copy operation, the copy token from the power-fail-safe data structure.

25. The one or more non-transitory, machine-readable storage media of claim 18, wherein the plurality of instructions, when executed, further cause the data storage device to:
detect a power failure event of the data storage device; and
store, in response to detection of the power failure event, the power-fail-safe data structure to the non-volatile data storage of the data storage device.

* * * * *